United States Patent [19]
Sörensen

[11] Patent Number: 5,392,895
[45] Date of Patent: Feb. 28, 1995

[54] TRANSFER UNIT

[75] Inventor: Leif Sörensen, Olofström, Sweden

[73] Assignee: AB Volvo, Gothenburg, Sweden

[21] Appl. No.: 150,131

[22] PCT Filed: Jun. 3, 1992

[86] PCT No.: PCT/SE92/00376

§ 371 Date: Nov. 30, 1993

§ 102(e) Date: Nov. 30, 1993

[87] PCT Pub. No.: WO92/21595

PCT Pub. Date: Dec. 10, 1992

[30] Foreign Application Priority Data

Jun. 5, 1991 [SE] Sweden .................. 9101714

[51] Int. Cl.6 .................. B65G 47/252; B21D 43/10
[52] U.S. Cl. .................. 198/375; 198/403; 198/412; 72/405
[58] Field of Search .................. 72/405; 198/621, 375, 198/403, 412; 414/750; 470/109, 154

[56] References Cited

U.S. PATENT DOCUMENTS

| | | |
|---|---|---|
| 1,615,965 | 2/1927 | Straight . |
| 2,806,581 | 9/1957 | Rees . |
| 3,805,943 | 4/1974 | Warren .................. 198/412 |
| 3,941,240 | 3/1976 | Rasenberger . |
| 4,523,670 | 6/1985 | Yanagisawa .................. 198/403 |
| 4,754,863 | 7/1988 | Tsuchiya .................. 198/403 |
| 4,940,382 | 7/1990 | Castelain .................. 414/750 |
| 5,000,027 | 3/1991 | Noda .................. 72/405 |

FOREIGN PATENT DOCUMENTS

| | | | |
|---|---|---|---|
| 423191 | 12/1925 | Germany .................. | 470/109 |
| 1188906 | 3/1965 | Germany .................. | 198/375 |
| 288332 | 3/1991 | Germany .................. | 72/405 |
| 60-10754 | 11/1985 | Japan .................. | 72/405 |
| 129479 | 7/1919 | United Kingdom . | |

Primary Examiner—Daniel C. Crane
Attorney, Agent, or Firm—Young & Thompson

[57] ABSTRACT

A transfer unit for transferring objects from a starting position to a final position, preferably between two presses in a plate pressing line, comprises two carriages (4, 5) which are displaceable along supporting rails (2, 3) and are provided with rotatable gripping devices (9–12) to grip and hold the object during the transfer which can be effected with or without turning over at the same time. The turn-over device makes it possible to turn the object during transfer and comprises a turning arm (24), one end of which is mounted in the carriage (4, 5), and the other end of which supports a follower (25) for cooperation with a guide rail (26, 27) with an essentially V-shaped portion (32–34), along which the turning arm (24) is guided as it is pivoted. The essentially V-shaped portion (32–34) consists of two arcuate guide rail sections (32, 33), which each extend from an individual straight portion (28, 29) of the guide rail, the free ends of the arcuate sections being equidistant from a point (35) where the tangents from the free ends intersect, and a switch piece (34) which can be pivoted between two end positions, in which it forms a continuation of one or the other of the two arcuate guide rail sections (32 or 33). The switch piece (34) can be locked in each of the end positions by a blocking mechanism (42) which can be released as the follower (25) is inserted into the switch piece (34).

5 Claims, 5 Drawing Sheets

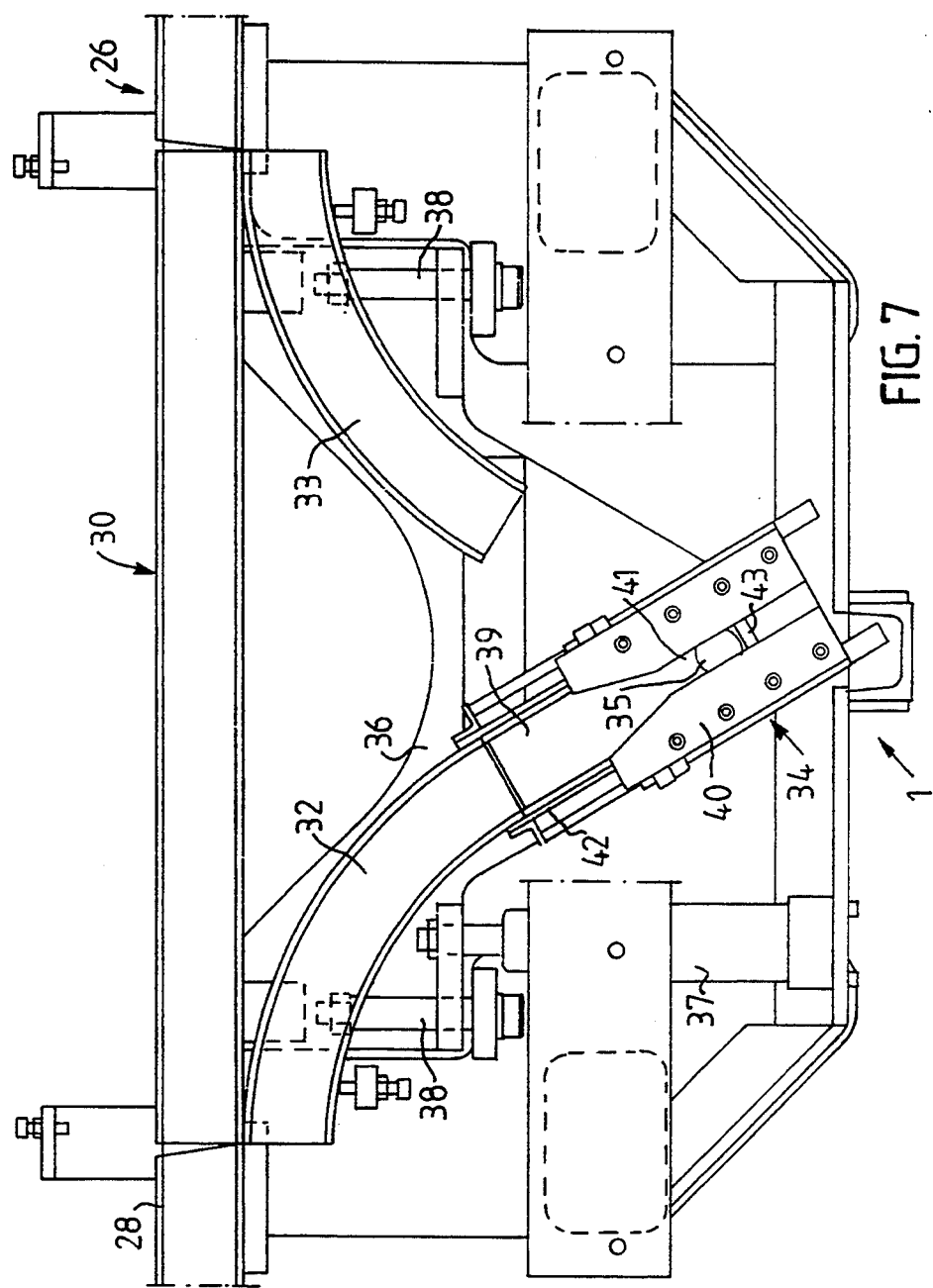

TRANSFER UNIT

This application is a 371 of PCT/SE92/00376, filed Jun. 3, 1992.

FIELD OF THE INVENTION

The present invention relates to a transfer unit for transferring objects from a starting position to an end position, preferably between two presses in a sheet metal pressing line.

BACKGROUND OF THE INVENTION

When pressing sheet metal objects, for example when manufacturing automobiles, a number of presses arranged in sequence are often used in a line to perform the various operations in preparing parts. Usually, mechanical devices are used for removing the object from a press and inserting the object in the subsequent press in the line. Between these mechanical devices, the object is transferred by means of a transfer unit of the type described by way of introduction. With the help of this transfer unit, the object can either be transferred in a straight path or the object can be turned over during transfer if this is required for the object to assume its correct position for pressing in the next press.

With the aid of the transfer unit, the object can thus be transferred along an essentially horizontal path between the two presses. If the object is to be turned over, this is done by a 180° rotation about an essentially horizontal axis which is perpendicular to the direction of movement of the object when transferred between the presses. The gripping devices in the transfer unit are adapted to the object to be transferred. In this manner, it is possible by interchanging the gripping devices to handle objects of different shapes and sizes.

SUMMARY OF THE INVENTION

The purpose of the invention is to provide a transfer unit of the type described by way of introduction, which performs, in a simple and secure manner, the transfer of objects and with which it is possible to simply and reliably select for straight transfer or transfer with turnover, said turnover being possible in one direction or the other depending on the size and shape of the objects transferred.

This is achieved by a transfer unit for transferring objects from a starting position to a final position, preferably between two presses in a plate pressing line. The transfer unit comprises two carriages which are displaceable along supporting rails and are provided with rotatable gripping devices to grip and hold the object during the transfer which can be effected with or without turning over at the same time. The turn-over device makes it possible to turn the object during transfer and comprises a turning arm, one end of which is mounted in the carriage, and the other end of which supports a follower for cooperation with a guide rail with an essentially V-shaped portion, along which the turning arm is guided as it is pivoted. The essentially V-shaped portion consists of two arcuate guide rail sections, which each extend from an individual straight portion of the guide rail, the free ends of the arcuate sections being equidistant from a point where the tangents from the free ends intersect, and a switch piece which can be pivoted between two end positions, in which it forms a continuation of one or the other of the two arcuate guide rail sections. The switch piece can be locked in each of the end positions by a blocking mechanism which can be released as the follower is inserted into the switch piece.

BRIEF DESCRIPTION OF THE DRAWINGS

The invention will be described below in more detail with reference to the accompanying drawings, where

FIG. 7 is a side view on a larger scale of a portion of the turn-over device of FIG. 5 in a second position.

DETAILED DESCRIPTION OF THE INVENTION

Figure 1:
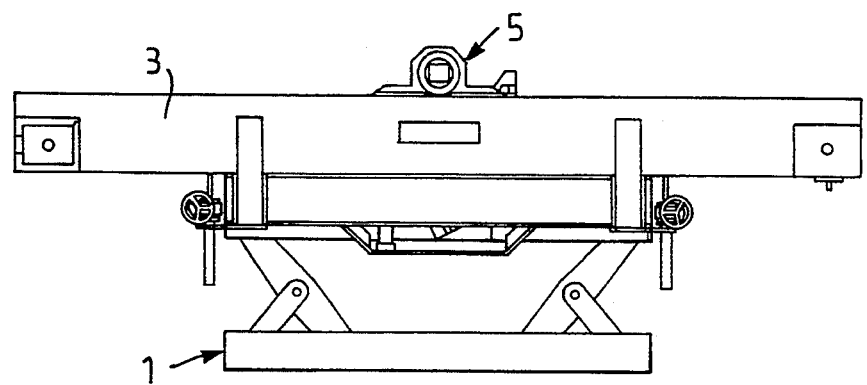
FIG. 1 is a side view of a transfer unit according to one embodiment of the invention.
Figure 2:
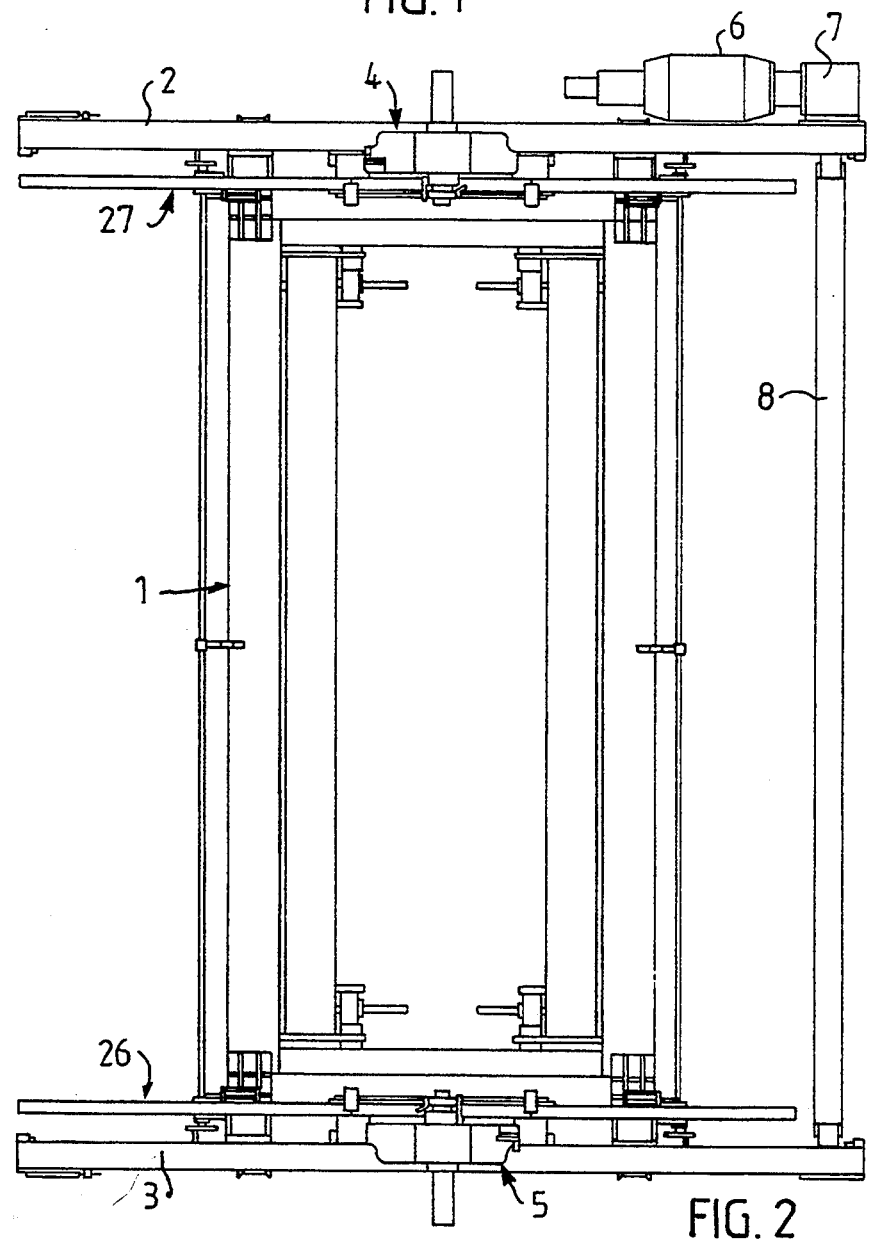
FIG. 2 is a plan view from above of the transfer unit according to FIG. 1.
Figure 3:
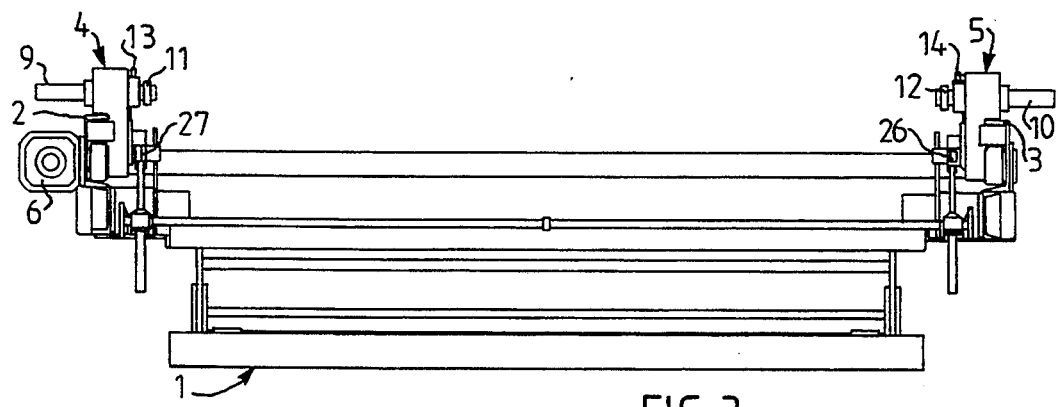
FIG. 3 is an end view of the transfer unit according to FIGS. 1 and 2.

FIGS. 1–3 show three views of a transfer device according to the invention. The transfer device is comprised of a frame 1, which can either be placed directly on a base between two presses in a press line (not shown) or can be provided with wheels or the like in order to be displaceable on a floor for example. The frame 1 comprises two supporting rails 2, 3, which are parallel and are disposed in the desired transfer direction on either side of the desired transfer path for the objects. Each of the supporting rails 2, 3 consists of a beam, along which a carriage 4, 5, respectively, is displaceable. Each carriage 4, 5, respectively, is supported by its supporting rail 2, 3, respectively, by means of support rollers (not shown in more detail here), so that the carriage 4, 5, respectively, is guided for rectilinear movement along its supporting rail 2, 3, respectively.

The carriages 4, 5 are driven by a drive motor 6 which is fixed to the supporting rail 2 and drives, by means of a bevel-gear drive 7, a shaft 8 which extends transversely to the frame 1 between the two supporting rails 2, 3. It is provided with drive wheels (not shown) for a cogged belt or the like (not shown). Each belt runs over a drive wheel on the shaft 8 and over a pulley at the opposite end of the supporting rail 2, 3, and is fixed to the carriage 4, 5, to drive it along the supporting rail 2, 3.

Each of the carriages 4, 5, is provided with a gripping device comprising a rotatable shaft 9, 10, mounted for rotation in each carriage 4, 5. The carriages 4, 5 are each mounted on its respective supporting rail 2, 3, so that the shafts 9, 10 are coaxial. At its end facing the other shaft, each shaft 9, 10 is provided with a mounting 11, 12 for a gripping means (not shown), which is designed to retain an object (not shown) which is to be transferred. In order to be able to adjust to objects of varying shape and size, the shafts 9, 10 are axially displaceable and can be locked in a desired position by locking means 13, 14.

Figure 4:
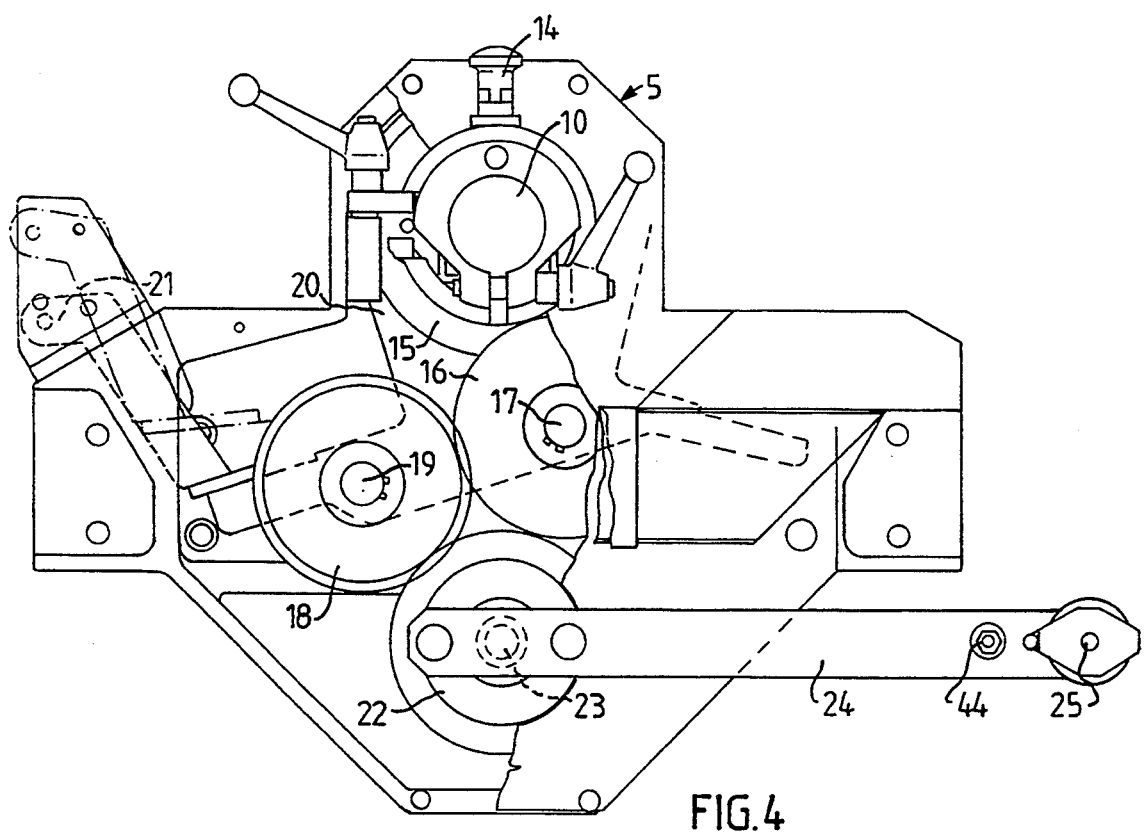
FIG. 4 is a partially cut-away side view of a carriage in the transfer unit according to FIGS. 1–3.

FIG. 4 shows the carriage 5 as seen from the left in FIG. 3 but in a larger scale and with certain components removed. The shaft 10 is axially displaceably but non-rotatably joined to a gear 15 which is rotatably mounted in the carriage 5. The gear 15 engages a transfer gear 16 which is rotatably mounted on a shaft 17 and is in engagement with an intermediate gear 18 rotatably mounted on a shaft 19. The shafts 17 and 19 are solidly mounted on a pivot arm 20 which is mounted for rotation about an axis coinciding with the axis of the shaft 10. The pivot arm 20 can be pivoted by means of an operating arm 21 extending therefrom between the position shown in FIG. 4 and a second position shown in FIG. 4 with dash-dot lines. In the first position the intermediate gear 18 is in engagement with a driving gear 22 which is mounted on a shaft 23 in the carriage 5. In the second position, in which the pivot arm 20 and the operating arm 21 are drawn with dash-dot lines in FIG. 4, the intermediate gear 18 is swung away from engagement with the drive gear 22, and the transfer gear 16 has been swung to a position in engagement with the drive gear 22.

On the drive gear 22, one end of a turning arm 24 is securely mounted. The other end of the turning arm 24 carries a follower in the form of a rotatably mounted roller 25. The roller 25 is disposed to run in a guide rail 26 mounted in the frame 1 inside the supporting rail 3. In a corresponding manner, a guide rail 27 is mounted inside the supporting rail 2 to cooperate with the carriage 4. In the following, only the guide rail 26 will be described, but the guide rail 27 and the associated components are arranged in a corresponding manner but in mirror image.

The guide rail 26 is shown in more detail in FIGS. 5 and 6 and comprises two straight portions 28 and 29 which are disposed essentially parallel to either end portion of the supporting rail 3, and a portion 30 intermediate the two straight portions 28 and 29, which intermediate portion will be described in more detail below.

Figure 5:
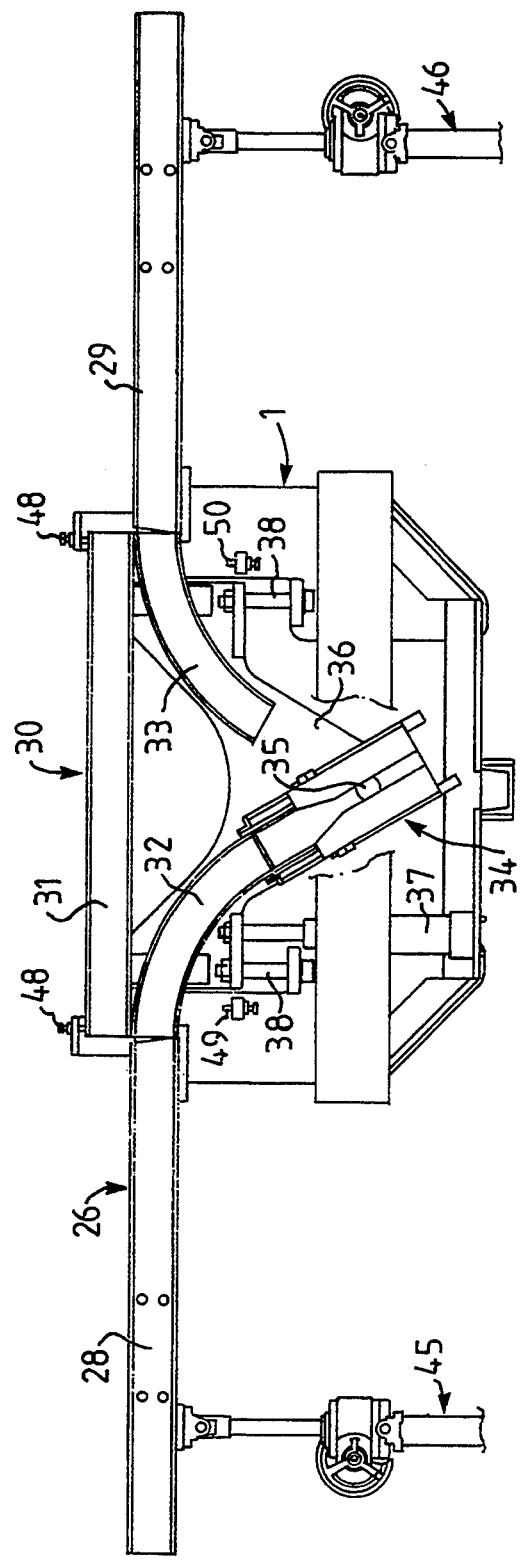
FIG. 5 is a side view of a turn-over device in the transfer unit according to FIGS. 1–3.
Figure 6:
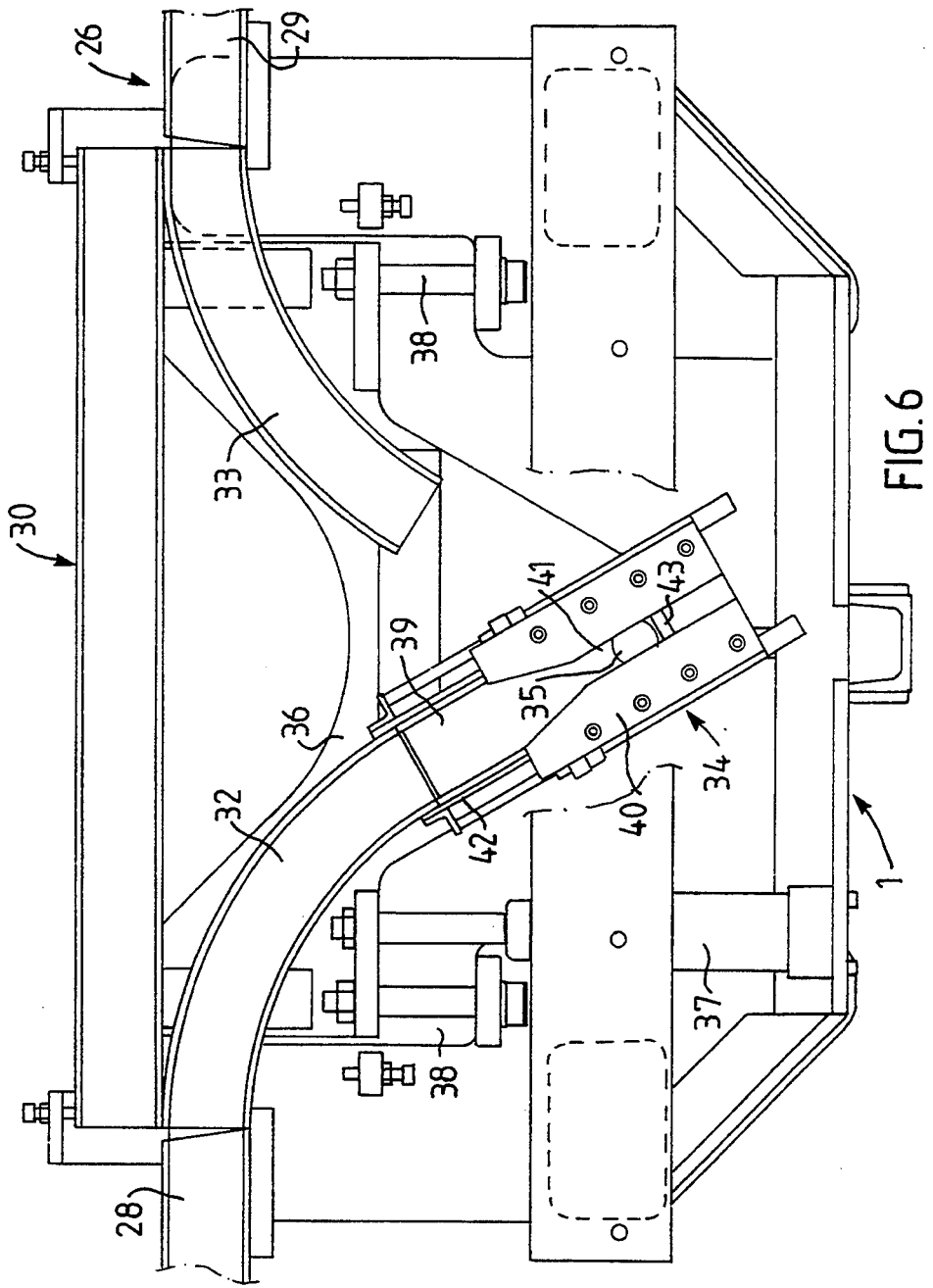
FIG. 6 is a side view on a larger scale of a portion of the turn-over device of FIG. 5 in a first position.

The intermediate portion 30 of the guide rail 26 comprises on the one hand a straight rail section 31 fitting between the two straight portions 28 and 29, and on the other hand two arcuate rail sections 32 and 33, which in the position shown in FIGS. 5 and 6 abut with their ends against the two straight portions 28 and 29. The free ends of the arcuate rail sections 32 and 33 are located equidistant from a point where the tangents from the free ends intersect, and between these free ends of the arcuate rail sections 32 and 33, a switch piece 34 is arranged. The switch piece 34 is pivotable about an axis 34 which coincides with the point where the tangents from the free ends of the arcuate rail sections 32 and 33 intersect. The switch piece 34 is pivotable about its axis 35 between a first position, which is shown in FIG. 5 and in which the switch piece 34 builds a straight continuation of the arcuate guide rail section 32, and a second position, in which the switch piece 34 builds a straight continuation of the arcuate guide rail section 33. The second position is indicated by dash-dot lines in FIG. 6.

The arcuate rail sections 32 and 33 and the switch piece 34 form together an essentially V-shaped portion which bridges the gap between the straight portions 28 and 29. The arcuate guide rail sections 32 and 33 and the switch piece 34 are mounted in a common subframe 36 which is displaceably mounted in the frame 1. The subframe 36 is displaceable between the position shown in FIGS. 5 and 6, where the arcuate guide rail sections 32 and 33 connect to the straight portions 28 and 29, respectively, and a second position where the straight rail section 31 is in alignment with the straight portions 28 and 29 to form a connection therebetween as shown in FIG. 7.

The subframe 36 is displaced between its two positions by means of a pressure medium cylinder 37 which is fixed to the frame 1 and the piston rod thereof is joined to the subframe 36. The subframe 36 moves in guides 38 which determine the two end positions.

The switch piece 34 is best revealed in FIG. 6. As was disclosed above, the switch piece 34 comprises a guide rail section 39 forming a continuation of the arcuate guide rail section 32 or 33. Furthermore, the switch piece 34 comprises a guide plate 40 with a longitudinal slot 41. The guide plate 40 and the slot 41 are intended to guide the switch piece 34 between its two positions as will be described in more detail below. The switch piece 34 also has a blocking mechanism in the form of a U-shaped element 42, the legs of which extend beyond the end of the switch piece 34 adjacent the arcuate guide rail section 32 or 33 in order to lock the switch piece 34 in the desired position. The U-shaped element 42 also has a transverse portion 43, which joins the legs and extends across the guide rail section 39. The U-shaped element 42 is spring-loaded to the position shown in FIGS. 5 and 6, but by pressing down the transverse portion 43, the legs of the U-shaped element 42 can be pulled away from the arcuate guide rail section 32 so that the switch piece 34 is released for pivoting about the axis 35.

The release of the switch piece 34 described above by pressing down the transverse portion 43 and pulling the legs of the U-shaped element 42 away from the arcuate guide rail section 32 is achieved by means of the roller 25 mounted on the turning arm 24, said roller pressing against the transverse portion 43 when it is inserted into the switch piece 34. A pin 44 is also mounted on the turning arm 24, and this pin is intended to be inserted into the slot 41 in the guide plate 40 in order to move the switch piece 34 from one position to the other after the U-shaped element 42 has been pushed away.

The functioning of this transfer device is as follows. When the transfer device is to be used without turning over the transferred objects, the subframe 36 is displaced downwards from the position shown in FIG. 5 to its second position where the straight guide rail section 31 bridges the gap between the straight portions 28 and 29, as shown in FIG. 7. When the carriage 5 is moved along the supporting rail 3, the roller 25 of the turning arm 24 will run along a straight path in the guide rail 26 and, in a corresponding manner, the turning arm on the carriage 4 will run along a straight path in guide rail 27.

If, however, it is desired that the object be turned over as it is transferred, the subframe 36 is placed in the position shown in FIGS. 5 and 6, wherein the arcuate guide rail sections 32 and 33 and the switch piece 34 comprise a portion of the guide rail 26. As the object is transferred from left to right in FIGS. 5 and 6, the turning arm 24 with its roller 25 will run along the straight portion 28 and along the arcuate guide rail section 32. When the roller 25 of the turning arm 24 is moved down along the arcuate guide rail section 32, the turning arm 24 will be pivoted about the shaft 23, and this pivot movement will be transmitted via the gears 22, 18, 16 and 15 to the shaft 10 which will turn the mounting 12 with the gripping means thereon as well as the object. A corresponding turning movement will occur at the other side of the object as the carriage 4 moves along the supporting rail 2. When the roller 25 of the turning arm 24 is inserted down into the switch piece 34, it will press against the transverse portion 43, so that the legs of the U-shaped element 42 will be pulled away from the arcuate guide rail section 32 and thus unlock the switch piece 34. At this time, the pin 44 is also inserted into the slot 41 in the guide plate 40, and as the carriage 5 continues to move and the arm 24 continues to pivot, the switch piece 34 will be forced by the pin 44 over to its second position, as is indicated by the dash-dot lines in FIG. 6, i.e. into alignment with the arcuate guide rail section 33. Additional movement of the carriage 5 will continue the pivoting of the turning arm 24, and the roller will be moved upwards out of the switch piece 34 and thus free the U-shaped element 42 for spring-biased movement so that the legs of the U-shaped element 42 are moved up on either side of the end of the arcuate guide rail section 33, thus blocking the switch piece 34 in this position. Continued movement of the carriage 5 will thereafter move the roller 25 of the turning arm 24 to the straight portion 29, and the turning over of the object is thus completed.

In the sequence described above the turning over of the object is done by turning the same in one direction, but in certain cases it may be desirable to turn over the object by turning in the opposite direction. In order to achieve this, the operating arm 21 is moved to the position shown with dash-dot lines in FIG. 4, thus releasing the intermediate gear 18 from the drive gear 22, while the transfer gear 16 is moved into engagement with the drive gear 22. In this manner, the gear 15 and thus the shaft 10 will be rotated in the opposite direction. In all other respects, the turning over process is as described above.

FIG. 5 also shows height adjustment means 45 and 46, by means of which the straight portions 28 and 29 of the guide rail can be moved somewhat vertically to adjust the position of the object at the beginning and end of a transfer sequence.

FIGS. 5 and 6 also show adjustment means 47, 48; 49, 50 for adjusting the end positions of the subframe 36, so that the arcuate guide rail sections 32 and 33 and the straight guide rail section will have the correct position relative to the straight portions 28 and 29.

I claim:

1. Transfer unit for transferring an object from a starting position to an end position, comprising two carriages which are each displaceable along an individual supporting rail in a frame, each of said carriage being provided with a rotatable gripping means arranged to grip and hold the object during transfer, and a turn-over device constructed and arranged for turning the object over during the transfer, by rotation about an axis joining the gripping means on the two carriages, said turn-over device comprising a turning arm, one end of which is fixedly mounted on a shaft, disposed in the carriage and joined to the gripping means, the other end of said turning arm supporting a follower which cooperates with a guide rail as the carriage moves along the supporting rail, said guide rail having an essentially V-shaped portion, along which the turning arm is guided during rotation, said essentially V-shaped portion of the guide rail having two arcuate guide rail sections, each arcuate guide rail section extending from an individual straight portion of the guide rail, with free ends of said arcuate guide rail sections terminating equidistant from a point where tangents extending from the free ends intersect, and a switch piece adapted to be pivoted between a first end position and a second end position, in which it forms a continuation of one or the other of the two arcuate guide rail sections, said switch piece being lockable in each of its end positions by blocking means which can be released as the follower is inserted into the switch piece.

2. Transfer unit according to claim 1, wherein the arcuate guide rail sections and the switch piece are mounted in a common subframe, which also supports a straight guide rail section of a length corresponding to the gap between two ends facing each other of the straight portions of the guide rail, said subframe being displaceable between a first position where the arcuate guide rail sections are in alignment with the straight portions, and a second position where the straight guide rail section is in alignment with the straight portions.

3. Transfer unit according to claim 1, wherein the blocking means comprises a U-shaped element mounted on the switch piece, said element being displaceable in the longitudinal direction of the switch piece, said element having legs which are spring-biased to a position where they extend beyond the end of the switch piece on either side of the arcuate guide rail section to thereby lock the switch piece, and said U-shaped element having a transverse portion via which said element is displaceable against the spring force to a position where the legs release the switch piece for pivoting.

4. Transfer unit according to claim 3, wherein the switch piece comprises a guide plate and a longitudinal slot, and the turning arm is provided with a laterally extending pin, which is arranged to be inserted into the slot in the guide plate to move, as the turning arm is pivoted, the switch piece from its first end position to its second end position, the follower on the turning arm being arranged via the transverse portion to release the blocking means.

5. Transfer unit according to claim 2, further comprising a pressure medium cylinder arranged between the frame and the subframe for displacing the subframe between its first and second positions.

* * * * *